United States Patent
Stanley et al.

(10) Patent No.: US 8,871,319 B2
(45) Date of Patent: Oct. 28, 2014

(54) FLEXIBLE BARRIER PACKAGING DERIVED FROM RENEWABLE RESOURCES

(71) Applicant: The Proctor & Gamble Company, Cincinnati, OH (US)

(72) Inventors: Scott Kendyl Stanley, Mason, OH (US); Norman Scott Broyles, Hamilton, OH (US); Andrew Julian Wnuk, Wyoming, OH (US); Jeffrey Charles Hayes, West Chester, OH (US); Emily Charlotte Boswell, Cincinnati, OH (US); Lee Matthew Arent, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/103,891

(22) Filed: Dec. 12, 2013

(65) Prior Publication Data

US 2014/0099455 A1    Apr. 10, 2014

Related U.S. Application Data

(63) Continuation-in-part of application No. 13/445,770, filed on Apr. 12, 2012, now abandoned.

(60) Provisional application No. 61/474,478, filed on Apr. 12, 2011.

(51) Int. Cl.
*B29D 22/00* (2006.01)
*B65D 65/40* (2006.01)
(Continued)

(52) U.S. Cl.
CPC .............. *B65D 65/466* (2013.01); *B65D 65/40* (2013.01); *B32B 2307/4023* (2013.01);
(Continued)

(58) Field of Classification Search
CPC .......... B32B 7/12; B32B 27/32; B32B 27/34; B32B 27/36; B32B 2250/02; B32B 2250/03; B32B 2250/24; B32B 2255/10; B32B 2255/205; B32B 2255/26; B32B 2270/00; B32B 2307/31; B32B 2307/4023; B65D 65/40
USPC .............. 428/34.3, 35.4, 35.7, 213, 220, 34.7, 428/34.8, 35.2

See application file for complete search history.

(56) References Cited

U.S. PATENT DOCUMENTS 3,329,331 A * 7/1967 Morgan ......................... 229/247
5,498,692 A   3/1996 Noda (Continued)

FOREIGN PATENT DOCUMENTS

| GB | 2 448 984 A | 11/2008 |
| WO | WO 2007/135037 A1 | 11/2007 |
| WO | WO 2009/032748 A2 | 3/2009 |

OTHER PUBLICATIONS

International Search Report and Written Opinion for (PCT/US2012/033302) dated Jun. 20, 2012.

*Primary Examiner* — N. Edwards
(74) *Attorney, Agent, or Firm* — Brent M. Peebles

(57) ABSTRACT

Disclosed herein are flexible barrier packages composed of materials that are substantially free of virgin, petroleum-based compounds. The flexible barrier packages contain a sealant that has a biobased content of at least about 85%. The sealant is laminated to an outer substrate that has a biobased content of at least about 95% via a tie layer that can further include an extruded substrate. The extruded substrate has a biobased content of at least about 85%. Ink optionally can be deposited on either side of the outer substrate, and the exterior surface of the outer substrate can further include a lacquer. A barrier material layer can be deposited or laminated between the first tie layer and the outer substrate. The flexible barrier packages of the invention are useful for enclosing a consumer product, for example, food, drink, wipes, shampoo, conditioner, skin lotion, shave lotion, liquid soap, bar soap, toothpaste, and detergent.

35 Claims, 3 Drawing Sheets

(51) Int. Cl.
  *B32B 27/32* (2006.01)
  *B32B 7/12* (2006.01)
  *B65D 65/46* (2006.01)
  *B32B 27/08* (2006.01)
  *B32B 27/36* (2006.01)
  *B32B 27/34* (2006.01)

(52) U.S. Cl.
  CPC ....... *B32B 2307/518* (2013.01); *B32B 2255/10* (2013.01); *B32B 2307/7246* (2013.01); *B32B 2307/746* (2013.01); *B32B 2307/54* (2013.01); *B32B 2255/26* (2013.01); *B32B 2307/7244* (2013.01); *B32B 2439/70* (2013.01); *B32B 2250/03* (2013.01); *B32B 27/32* (2013.01); *B32B 2250/02* (2013.01); *B32B 2307/7248* (2013.01); *B32B 2307/75* (2013.01); *B32B 7/12* (2013.01); *B32B 2307/554* (2013.01); *B32B 2255/205* (2013.01); *B32B 2250/24* (2013.01); *B32B 2270/00* (2013.01); *B32B 2307/31* (2013.01); *B32B 27/08* (2013.01); *B32B 27/36* (2013.01); *B32B 27/34* (2013.01); *B32B 2439/46* (2013.01)
  USPC ................. 428/35.2; 428/34.7; 428/34.8

(56) References Cited

U.S. PATENT DOCUMENTS

| | | | |
|---|---|---|---|
| 7,943,218 B2 * | 5/2011 | Knoerzer et al. | 428/35.4 |
| 2008/0274245 A1 * | 11/2008 | Lee et al. | 426/394 |
| 2009/0142614 A1 | 6/2009 | Mori et al. | |
| 2009/0286090 A1 | 11/2009 | Ting et al. | |
| 2012/0288693 A1 | 11/2012 | Stanley et al. | |
| 2013/0337244 A1 * | 12/2013 | Stanley et al. | 428/212 |
| 2014/0099455 A1 * | 4/2014 | Stanley et al. | 428/34.3 |

* cited by examiner

FLEXIBLE BARRIER PACKAGING DERIVED FROM RENEWABLE RESOURCES

FIELD OF THE INVENTION

The invention relates to flexible barrier packaging that is derived from renewable resources. These packages are useful for enclosing consumer products, such as, for example, food, drink, wipes, shampoo, conditioner, skin lotion, shave lotion, liquid soap, bar soap, toothpaste, and detergent.

BACKGROUND OF THE INVENTION

Polymers, such as polyethylene, have long been used as flexible packaging material. Flexible packages are generally composed of multiple layers that include different types of materials to provide desired functionality, such as flexibility, sealing, barrier, and printing. In food packaging, for example, the flexible packaging material is often used as a protective agent for the food. Flexible packages are also used to house a variety of consumer products, such as products for hair care, beauty care, oral care, health care, personal cleansing, and household cleansing.

Plastic packaging uses nearly 40% of all polymers, a substantial share of which is employed for flexible packaging. Most of the polymers used for flexible packaging applications, such as polyethylene and polyethylene terephthalate, are derived from monomers (e.g., ethylene, terephthalic acid, and ethylene glycol) that are obtained from non-renewable, fossil-based resources (e.g., petroleum, natural gas, and coal). Thus, the price and availability of the petroleum, natural gas, and coal feedstock ultimately have a significant impact on the price of polymers used for flexible packaging materials. As the worldwide price of petroleum, natural gas, and/or coal escalates, so does the price of flexible packaging materials. Furthermore, many consumers display an aversion to purchasing products that are derived from petrochemicals. In some instances, consumers are hesitant to purchase products made from limited non-renewable resources (e.g., petroleum, natural gas and coal). Other consumers may have adverse perceptions about products derived from petrochemicals as being "unnatural" or not environmentally friendly.

In response, producers of flexible packages have begun to use polymers derived from renewable resources (e.g., bio-polyethylene) to produce parts of their packages. These flexible packages, however, still contain a substantial amount of virgin, petroleum-based materials. Some producers have attempted to form flexible packages almost entirely made from polymers derived from renewable resources. For example, Innovia LLC manufactures a metalized cellulose film that contains 90% renewable content, as determined by ASTM 6866-12, that can be made into 12"×2" sachets (i.e., NatureFlex™). However, when these sachets are filled with water and allowed to sit overnight, visible cracking of the metalized film was observed, and the sachets failed within 24 hours, as evidenced by droplets visibly seeping through the film. Flexible packages composed of polylactic acid (PLA) derived from corn also have met with limited success. Although containers made from PLA are sustainable, industrially compostable, and environmentally friendly, they are currently unfit for long-term preservation because of their sensitivity to heat, shock, and moisture. For example, packages derived from PLA tend to shrivel up, shrink, and break down when exposed to household chemicals, such as bleach and alcohol ethoxylate (i.e., the active ingredient in Mr. Clean®), when the PLA is in direct contact with the product. Frito Lay has produced an all PLA laminate film structure and has disclosed this structure and other variants (e.g., using PLA, PHA, paper, and recycled material) in WO/2009/032748, incorporated herein by reference.

Polyhydroxyalkanoates (PHAs) also have been of general interest for use as renewable materials for forming flexible packaging. For example, U.S. Pat. No. 5,498,692, incorporated herein by reference, discloses a flexible film composed of a polyhydroxyalkanoate copolymer that has at least two randomly repeating monomer units. This film can be used to form, for example, grocery bags, food storage bags, sandwich bags, resealable Ziploc®-type bags, and garbage bags. Flexible packages composed only of PHA, however, will not meet the barrier requirements for most consumer goods. Further, their actual use as a plastic material has been hampered by their thermal instability. PHAs tend to have low melt strengths and may also suffer from a long set time, such that they tend to be difficult to process. Further still, PHAs tend to undergo thermal degradation at very high temperatures. Still further, PHAs have poor gas and moisture barrier properties, and are not well suited for use as packaging materials, as described in US2009/0286090, incorporated herein by reference.

Flexible packages composed of paper that is extrusion coated with a grade of MATER-BI™ thermoplastic starch film manufactured by Novamont are also known. These packages are useful for containing solids, such as, for example, a single serving of sugar, but do not have the barrier properties necessary for many other consumer goods.

Additional materials derived from renewable resources that have been used to form flexible packages include, for example, pectin, gluten, and other proteins. Because these packages are water soluble, they have limited use unless they are contained within exterior packages with moisture barrier properties.

Currently used flexible packaging that is wholly composed of materials derived from renewable resources (e.g., cellulose, PLA, PHA) typically exhibits one or more undesirable properties with respect to manufacture, stability, and performance (e.g., inability to withstand the manufacturing process, short shelf life, and/or poor barrier ability). Accordingly, it would be desirable to provide flexible barrier packaging that is substantially free of virgin, petroleum-based compounds that also includes desirable properties with respect to manufacture, stability, and performance.

SUMMARY OF THE INVENTION

The invention relates to a flexible barrier package. The package includes a sealant, a first tie layer coating the sealant, and an outer substrate laminated to the sealant via the first tie layer. The sealant has a thickness of about 1 µm to about 750 µm and a biobased content of at least about 85%, preferably at least about 90%, more preferably at least about 95%, for example, about 97% or about 100%. The first tie layer coating the sealant includes an adhesive with a thickness of about 1 µm to about 20 µm, and optionally having a biobased content of at least about 95%, preferably at least about 97%, more preferably at least about 99%. In some embodiments, the first tie layer further includes an extruded substrate that has a thickness of about 1 µm to about 750 µm, and a biobased content of at least about 85%. The outer substrate laminated to the sealant via the first tie layer has a thickness of about 2.5 µm to about 300 µm, and a biobased content of at least about 95%, preferably at least about 97%, more preferably at least about 99%. The flexible barrier package exhibits a lamination strength of sealant to outer substrate of at least about 1.0 N per 25.4 mm of sample width, as determined by ASTM F904-98

(2008), after the package is filled to three-quarters of its volume with a laundry powder a (i.e., about 30 wt. % of soda ash, about 67 wt. % of zeolite, about 1.5 wt. % of methyl anthranilate, and about 1.5 wt. % of ethyl acetate, based on the total weight of the composition) and placed in a room at 50% relative humidity (RH) at 55° C. for at least about one month, preferably at least about two months, more preferably at least about 3 months, even more preferably at least about 4 months.

The flexible barrier package can further include ink that has a thickness of about 1 µm to about 20 µm, which is deposited on either or both sides of the outer substrate. The flexible barrier package also can optionally include a lacquer having a thickness of about 1 µm to about 10 µm on the exterior surface of the outer substrate. In some embodiments, the sealant further comprises an additive, such as, for example, a slip agent, a filler, an antistatic agent, a pigment, a UV inhibitor, a biodegradable-enhancing additive, an anti-coloring agent, or mixtures thereof.

In some aspects, the flexible barrier package can further include a barrier material layer that is deposited or laminated between the first tie layer and the outer substrate, wherein the barrier material layer has a thickness of about 200 Å to about 50 µm. The barrier material layer is coated with a second tie layer that has a thickness of about 1 µm to about 20 µm and includes an adhesive that optionally has a biobased content of at least about 95%. In some aspects, the flexible barrier package can further include a barrier material layer that is either deposited onto the sealant or laminated between the sealant and the outer substrate, wherein the barrier material layer has a thickness of about 200 Å to about 50 µm and the barrier material layer is coated with a tie layer that has a thickness of about 1 µm to about 20 µm and includes an adhesive that optionally has a biobased content of at least about 95%. In these aspects, the flexible barrier package, after it is filled to three-quarters of its volume with a shampoo β having a pH of about 5.5 (i.e., about 10 wt. % of ammonium laureth-3 sulfate, about 6 wt. % of ammonium lauryl sulfate, about 0.6 wt. % of cetyl alcohol, about 0.7 wt. % of sodium chloride, about 0.4 wt. % of sodium citrate dihydrate, about 0.15 wt. % of citric acid, about 1.5 wt. % of methyl anthranilate, about 1.5 wt. % of ethyl acetate, and about 20.85 wt. % of water, based on the total weight of the composition) and placed in a room at 50% relative humidity (RH) at 55° C. for at least about one month, preferably at least about two months, more preferably at least about 3 months, even more preferably at least about 4 months, exhibits (i) a lamination strength of sealant to outer substrate of at least about 1.0 N per 25.4 mm of sample width, as determined by ASTM F904-98 (2008); (ii) a lamination strength between the sealant and the barrier material layer of at least about 1.0 N per 25.4 mm of sample width, as determined by ASTM F904-98 (2008); and (iii) a lamination strength between the barrier material layer and the outer substrate of at least about 1.0 N per 25.4 mm of sample width, as determined by ASTM F904-98 (2008).

In another aspect, described herein are flexible barrier packages that include a sealant that has a thickness of about 5 µm to about 750 µm and a biobased content of at least about 85%. In this aspect, the package exhibits a mass loss of less than about 1 wt. %, based on the total weight of the package, after it is filled to three-quarters of its volume with a laundry powder a (i.e., about 30 wt. % of soda ash, about 67 wt. % of zeolite, about 1.5 wt. % of methyl anthranilate, and about 1.5 wt. % of ethyl acetate, based on the total weight of the composition), sealed, and placed in a room at 50% relative humidity (RH) at 55° C. for at least about one month, preferably at least about two months, more preferably at least about 3 months, even more preferably at least about 4 months, weighed, and then placed on a standard vibration table, subjected to 1 hour of cycled vibrations ramped at 1 Hz/min from 0 to about 60 Hz, followed by 1 hour ramped at 1 Hz/min from about 60 Hz to 0 Hz, and then reweighed.

In some embodiments of this aspect, the flexible barrier package further includes ink that has a thickness of about 1 µm to about 20 µm, and an optional lacquer that has a thickness of about 1 µm to about 750 µm deposited on the exterior surface of the flexible barrier package. In these embodiments, the flexible barrier package exhibits no ink transfer to a probe, as determined by ASTM D5264-98, after it is filled to three-quarters of its volume with a laundry powder a (about 30 wt. % of soda ash, about 67 wt. % of zeolite, about 1.5 wt. % of methyl anthranilate, and about 1.5 wt. % of ethyl acetate, based on the total weight of the composition) and placed in a room at 50% relative humidity (RH) at 55° C. for at least about one month, preferably at least about two months, more preferably at least about 3 months, even more preferably at least about 4 months.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

Figure 1:
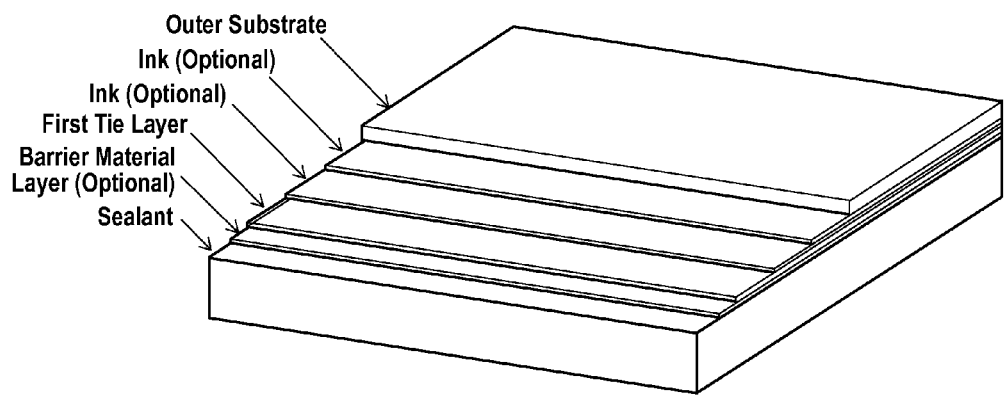
FIG. 1 depicts a 2-ply laminate structure suitable for a flexible barrier package that includes a sealant laminated to an outer substrate via a tie layer that includes an adhesive and further includes an extruded substrate. Ink can be deposited on the interior surface of the outer substrate. Optionally, a barrier material layer can be either deposited onto the sealant or laminated between the sealant and outer substrate layers.

Optionally, a barrier material layer can be deposited on the exterior side of the sealant layer.

DETAILED DESCRIPTION OF THE INVENTION

Flexible barrier packages have now been developed that are substantially free of virgin, petroleum-based materials and that also have desirable manufacturing, stability, and performance properties. Flexible packages, which typically have a wall thickness of less than about 200 μm, are usually non-load bearing (i.e., the package is unable to support the weight of other packages without gross deformation). The flexible barrier packages described herein are advantageous because they have the same look and feel, and similar performance characteristics as flexible barrier packages made from virgin, petroleum-based materials (e.g., moisture vapor transmission rate (MVTR), lamination strength, and coefficient of friction), yet the flexible barrier packages described herein have improved sustainability over packages derived from virgin, petroleum-based materials.

As used herein, "sustainable" refers to a material having an improvement of greater than 10% in some aspect of its Life Cycle Assessment or Life Cycle Inventory, when compared to the relevant virgin, petroleum-based material that would otherwise have been used for manufacture. As used herein, "Life Cycle Assessment" (LCA) or "Life Cycle Inventory" (LCI) refers to the investigation and evaluation of the environmental impacts of a given product or service caused or necessitated by its existence. The LCA or LCI can involve a "cradle-to-grave" analysis, which refers to the full Life Cycle Assessment or Life Cycle Inventory from manufacture ("cradle") to use phase and disposal phase ("grave"). For example, high density polyethylene (HDPE) containers can be recycled into HDPE resin pellets, and then used to form containers, films, or injection molded articles, for example, saving a significant amount of fossil-fuel energy. At the end of its life, the polyethylene can be disposed of by incineration, for example. All inputs and outputs are considered for all the phases of the life cycle. As used herein, "End of Life" (EoL) scenario refers to the disposal phase of the LCA or LCI. For example, polyethylene can be recycled, incinerated for energy (e.g., 1 kilogram of polyethylene produces as much energy as 1 kilogram of diesel oil), chemically transformed to other products, and recovered mechanically. Alternatively, LCA or LCI can involve a "cradle-to-gate" analysis, which refers to an assessment of a partial product life cycle from manufacture ("cradle") to the factory gate (i.e., before it is transported to the customer) as a pellet. Alternatively, this second type of analysis is also termed "cradle-to-cradle".

The flexible barrier packages of the invention are also advantageous because any virgin polymer used in the manufacture of the package is derived from a renewable resource. As used herein, the prefix "bio-" is used to designate a material that has been derived from a renewable resource. As used herein, a "renewable resource" is one that is produced by a natural process at a rate comparable to its rate of consumption (e.g., within a 100 year time frame). The resource can be replenished naturally, or via agricultural techniques. Nonlimiting examples of renewable resources include plants (e.g., sugar cane, beets, corn, potatoes, citrus fruit, woody plants, lignocellulosics, hemicellulosics, cellulosic waste), animals, fish, bacteria, fungi, and forestry products. These resources can be naturally occurring, hybrids, or genetically engineered organisms. Natural resources such as crude oil, coal, natural gas, and peat, which take longer than 100 years to form, are not considered renewable resources. Because at least part of the flexible barrier package of the invention is derived from a renewable resource, which can sequester carbon dioxide, use of the flexible barrier package can reduce global warming potential and fossil fuel consumption. For example, some LCA or LCI studies on HDPE resin have shown that about one ton of polyethylene made from virgin, petroleum-based sources results in the emission of up to about 2.5 tons of carbon dioxide to the environment. Because sugar cane, for example, takes up carbon dioxide during growth, one ton of polyethylene made from sugar cane removes up to about 2.5 tons of carbon dioxide from the environment. Thus, use of about one ton of polyethylene from a renewable resource, such as sugar cane, results in a decrease of up to about 5 tons of environmental carbon dioxide versus using one ton of polyethylene derived from petroleum-based resources.

Nonlimiting examples of renewable polymers include polymers directly produced from organisms, such as polyhydroxyalkanoates (e.g., poly(beta-hydroxyalkanoate), poly(3-hydroxybutyrate-co-3-hydroxyvalerate, NODAX™), and bacterial cellulose; polymers extracted from plants and biomass, such as polysaccharides and derivatives thereof (e.g., gums, cellulose, cellulose esters, chitin, chitosan, starch, chemically modified starch), proteins (e.g., zein, whey, gluten, collagen), lipids, lignins, and natural rubber; and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The flexible barrier packages described herein are further advantageous because their properties can be tuned by varying the amount of bio-material and recycled material used to form the components of the flexible barrier package, or by the introduction of additives. For example, increasing the amount of bio-material at the expense of recycled material (when comparing like-for-like, e.g., homopolymer versus copolymer), tends to result in packages with improved mechanical properties. Increasing the amount of specific types of recycled material can decrease the overall costs of producing the packages, but at the expense of the desirable mechanical properties of the package because recycled material tends to be more brittle with a lower modulus, resulting from a lower average molecular weight of the recycled material.

Even further, the flexible barrier packages described herein are advantageous because they can act as a one-to-one replacement for similar flexible barrier packages containing polymers that are wholly or partially derived from virgin, petroleum-based materials, and because they can be produced using existing manufacturing equipment, reactor conditions, and qualification parameters. The use of renewable flexible barrier packages results in a reduction of the environmental footprint of flexible barrier packages, and in less consumption of non-renewable resources. The reduction of the environmental footprint occurs because the rate of replenishment of the resources used to produce the package's raw construction material is equal to or greater than its rate of consumption, because the use of a renewable derived material often results in a reduction in greenhouse gases due to the sequestering of atmospheric carbon dioxide, or because the raw construction material is recycled (consumer or industrial) within the plant, to reduce the amount of virgin plastic used and the amount of used plastic that is wasted, e.g., disposed of in a landfill.

Still further, the flexible barrier packages described herein have a relatively long shelf life (e.g., at least about 1 year, preferably at least about 2 years), which allows them to be stored or transported for a long period of time without a decrease in the physical and chemical integrity of the flexible barrier package (e.g., no delamination, discoloring, etc., from consumer product exposure). The films used to produce the flexible barrier packages described herein can advantageously be used to form other articles, such as, for example, trash bags; components of diapers, incontinence products, and feminine hygiene products; bags for diapers, incontinence products, or feminine hygiene products; food packaging; tubs, refill packs; and standup pouches.

The specification mentions a number of ASTM test methods. The first number indicates the test method, for example, the fixed designation D882; the number immediately following the designation indicates the year of original adoption or, in the case of revision, the year of last revision. A number in parentheses indicates the year of last reapproval. A superscript epsilon (c) indicates an editorial change since the last revision or reapproval.

Composition of the Flexible Barrier Packages

Disclosed herein are single-ply and multi-ply (e.g., 2-ply, 3-ply) flexible barrier packages composed of materials that are substantially free of virgin, petroleum-based materials. The flexible barrier packages contain a sealant that has a biobased content of at least about 85%. The sealant is laminated to an outer substrate that has a biobased content of at least about 95% via a tie layer that includes an adhesive that optionally has a biobased content of at least about 95%. The tie layer can further include an extruded substrate that has a biobased content of at least about 85%. Optionally, ink can be deposited on either side of the outer substrate, and the exterior surface of the outer substrate optionally can further include a lacquer. A barrier material layer can be deposited or laminated between the first tie layer and the outer substrate or onto the sealant layer.

Figure 2:
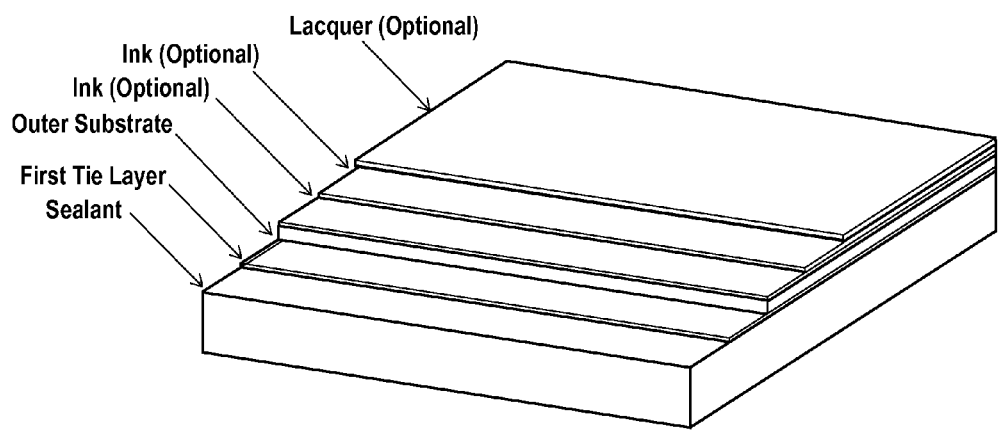
FIG. 2 depicts a 2-ply laminate structure suitable for a flexible barrier package that includes a sealant laminated to an outer substrate via a tie layer that includes an adhesive. Ink can be deposited on the exterior surface of the outer substrate, and the outer substrate optionally can be coated with a lacquer.

In a first aspect, the invention relates to a 2-ply flexible barrier package represented by FIG. 1. The flexible barrier package of this aspect is composed of a sealant that is laminated to an outer substrate via a tie layer that includes an adhesive. Optionally, ink can be deposited on either side of the outer substrate. If ink is present on the exterior surface of the outer substrate, the outer substrate optionally can be coated with a lacquer. FIG. 2 represents a 2-ply flexible barrier package that is optionally coated with a lacquer.

Figure 3:
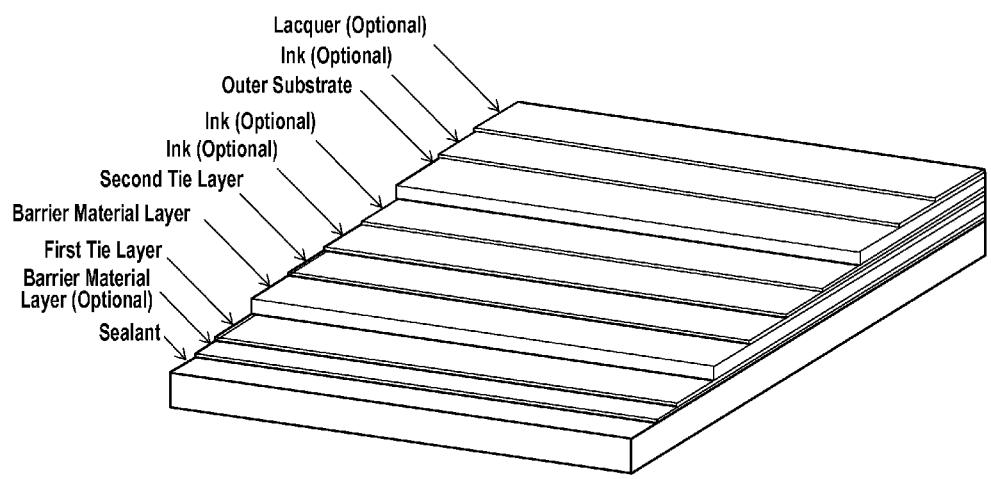
FIG. 3 depicts a 3-ply laminate structure suitable for a flexible barrier package that includes a sealant laminated to a barrier material layer via a tie layer that includes an adhesive, which itself is laminated to an outer substrate through an additional tie layer that includes an adhesive. Ink can be deposited on either side of the outer substrate. If ink is present on the exterior surface of the outer substrate, the outer substrate optionally can be coated with a lacquer.

In a second aspect, the invention relates to a 3-ply flexible barrier package represented by FIG. 3. The flexible barrier package of this aspect is composed of a sealant that is laminated to one side of a barrier material layer via a tie layer that includes an adhesive. The other side of the barrier material layer is laminated to an outer substrate via another tie layer that includes an adhesive. Alternatively, the barrier material layer can be deposited between the sealant and outer substrate instead of undergoing lamination. Optionally, ink can be deposited on either side of the outer substrate. If ink is present on the exterior surface of the outer substrate, the outer substrate optionally can be coated with a lacquer.

Figure 4:
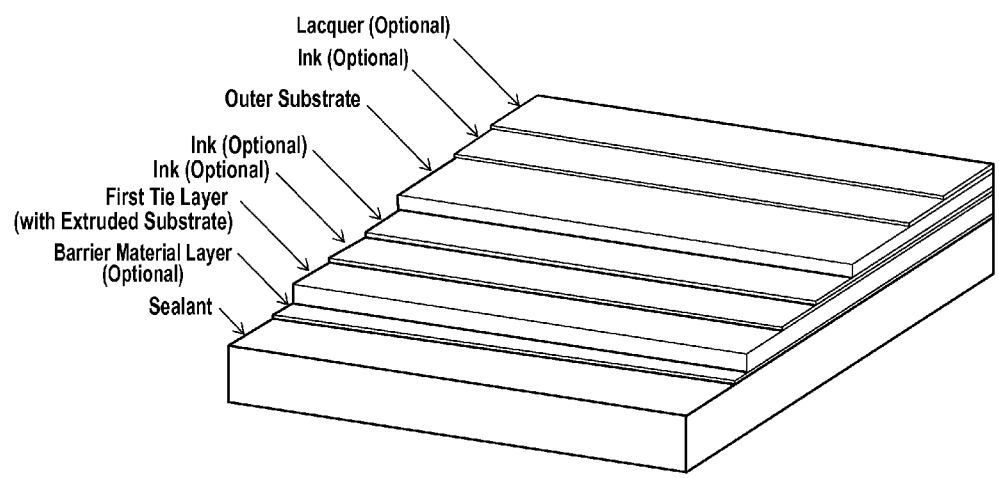
FIG. 4 depicts a 3-ply laminate structure suitable for a flexible barrier package that includes a sealant laminated to an outer substrate through a tie layer that includes an adhesive and an extruded material. Ink can be deposited on either side of the outer substrate. If ink is present on the exterior surface of the outer substrate, the outer substrate optionally can be coated with a lacquer.

In a third aspect, the invention relates to a 3-ply flexible barrier package represented by FIG. 4. The flexible barrier package of this aspect is composed of a sealant that is laminated to an outer substrate through a tie layer, which includes an extruded substrate. Optionally, a barrier material layer coats the sealant. Further, optionally, ink can be deposited on either side of the outer substrate. If ink is present on the exterior surface of the outer substrate, the outer substrate optionally can be coated with a lacquer.

Figure 5:
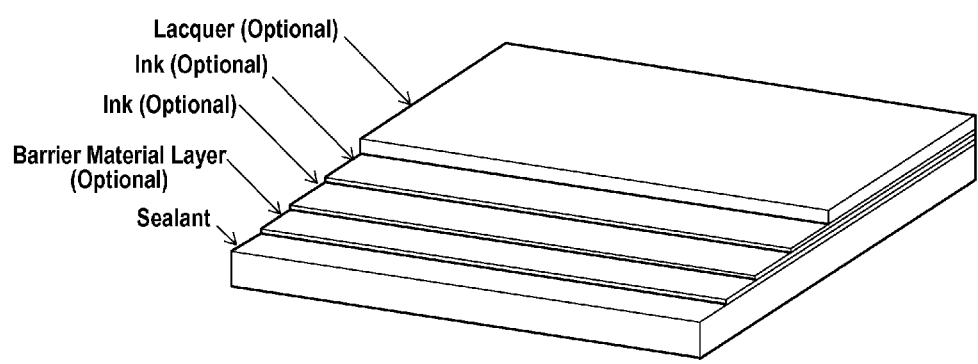
FIG. 5 depicts a single-ply laminate structure suitable for a flexible barrier package that includes a sealant. Ink can be deposited on the exterior surface of the sealant and, if ink is present, the sealant optionally can be coated with a lacquer.

In a fourth aspect, the invention relates to a single-ply flexible barrier package represented by FIG. 5. The flexible barrier package of this aspect is composed of a sealant, upon which a barrier material layer can optionally be deposited and further, upon which ink can be optionally deposited. If ink is deposited on the exterior surface of the sealant, the sealant optionally can be coated with a lacquer.

Sealant

The sealant provides bulk, heat sealing, and barrier protection properties to the flexible barrier packages described herein. The sealant can be any sealant that has is compatible with the consumer products described herein, and has a biobased content of at least about 85%, preferably at least about 90%, more preferably at least about 95%, even more preferably at least about 97%, for example about 99% or about 100%.

The sealant can be selected from the group consisting of consisting of high density polyethylene (HDPE) and linear low density polyethylene (LLDPE), each of which are available from, for example, Braskem; low density polyethylene (LDPE) and ultra low linear low density polyethylene (ULDPE), each of which are achievable from sugar cane using a technology, such as, or similar to, the Hostalen/Basell technology or a Spherilene/Basell technology of Braskem; polyhydroxyalkanoate (PHA, available from, for example, Ecomann China, Meredian, and Metabolix); a starch-based film (available from, for example, Novamont, Biome, Cardia, Teknor Apex or Plantic); a starch blended with a polyester (available from, for example, Ecoflex from BASF or using a bio-sourced polyester e.g., bio-glycerol, organic acid, and anhydride, as described in U.S. Patent Application No. 2008/0200591, incorporated herein by reference), polybutylene succinate (formed from, for example, the polymerization of bio-1,4-butanediol, which can be derived from the fermentation of sugars, a process available from companies such as Genomatica, and bio-succinic acid, which can be produced as a natural fermentation product and available from companies such as MBI; see U.S. Pat. No. 7,858,350, incorporated herein by reference), polyglycolic acid (PGA) (from, for example, bio-glycolic acid monomer as produced by METabolic EXplorer), polyvinyl chloride (PVC) (available from, e.g., Braskem), and mixtures thereof. In some preferred embodiments, the sealant is selected from the group consisting of HDPE, LDPE, LLDPE, ULDPE, and mixtures thereof. Optionally, the sealant includes paper and the sealant coats the paper.

The sealant is present in a thickness of about 1 µm to about 750 µm, preferably about 25 µm to about 75 µm, more preferably about 30 µm to about 50 µm. For example, when the package encloses a liquid, the sealant is present in a thickness of about 30 µm to about 50 µm; and when the package encloses a powder, the sealant is present in a thickness of about 25 µm to about 40 µm. When no other barrier is present, a thinner sealant results in a package with a higher moisture vapor transition rate (MVTR), a decreased structural integrity, and a shorter shelf life, while a thicker sealant results in a package with a lower MVTR and an increased structural integrity.

The sealant optionally can include an additive. The additive can include, for example, a slip agent or an antistatic agent (e.g., euracamide, a steramide), a filler (e.g., talc, clay, pulp, thermoplastic starch, raw starch wood flour, diatomaceous earth, silica, inorganic glass, inorganic salts, pulverized plasticizer, pulverized rubber), a pigment (e.g., mica, titania, carbon black), a UV inhibitor, an anti-coloring agent, and a biodegradable-enhancing additive (e.g., an oxo-degradable additive or an organic material). An oxo-degradable additive is often compounded into a polymer in a concentration of about 1 wt. % to about 5 wt. %, based on the total weight of the polymer, and includes at least one transition metal that can foster oxidation and chain scission in plastics when exposed to heat, air, light, or mixtures thereof. Organic materials (e.g., cellulose, starch, ethylene vinyl acetate, and polyvinyl alcohol) also can be used as biodegradable-enhancing additives, although they cannot promote degradation of the non-degradable portion of the polymer matrix. In exemplary embodiments, the additive includes euracamide, a steramide, mica, an oxo-degradable additive, talc, clay, pulp, titania, thermoplastic starch, raw starch wood flour diatomaceous earth, carbon black, silica, inorganic glass, inorganic salts (e.g., NaCl), pulverized plasticizer, pulverized rubber, and mixtures thereof.

First Tie Layer

The sealant can be laminated to an outer substrate via a first tie layer that includes an adhesive. The adhesive optionally has a biobased content of at least about 95%, preferably at least about 97%, more preferably at least about 99%, for example, about 100%. Lamination can be accomplished through "extrusion" or "adhesive" process. Lamination involves laying down a molten curtain of polymer by extruding through a flat die (for extrusion lamination) or a liquid layer (for adhesive lamination) between the sealant and the outer substrate at high speeds (typically about 100 to about 1000 feet per minute, preferably about 300 to about 800 feet per minute). For extrusion lamination, the laminate structure then comes into contact with a cold (chill) roll. For adhesive lamination, the laminate undergoes thermal drying in line and then additional curing over about 12 to about 48 hours for the laminate to reach maximum adhesion strength The adhesive is present in a thickness of about 1 µm to about 20 µm, preferably about 1 µm to about 10 µm, more preferably about 2.5 µm to about 3.5 µm. A thinner adhesive results in a flexible barrier package that dries and cures faster and is less expensive. A thicker adhesive results in a flexible barrier package that attains the desired bond strength, but is more expensive and takes a longer period of time to dry and cure. The adhesive can be a solvent adhesive or a solventless adhesive. Examples of the adhesive include a urethane-based adhesive, a water-based adhesive, or a nitrocellulose-based adhesive. Optionally, the adhesive is a bio-adhesive, such as, a PLA-based adhesive (e.g., Biopolymer 26806 from Danimer Scientific LLC, MATER-BI® from Novamontk, BioTAK® by Berkshire Labels), a starch-based adhesive, or mixtures thereof.

In some optional embodiments, the first tie layer further includes an extruded substrate that has a biobased content of at least about 85%, preferably at least about 90%, more preferably at least about 95%, for example, at least about 99%. The extruded substrate is present in a thickness of about 1 µm to about 750 µm, preferably about 1 µm to about 50 µm. A thinner extruded substrate results in a flexible barrier package that is less expensive, more flexible, and has less bulk. A thicker extruded substrate results in a flexible barrier package that is more expensive, less flexible, and has more bulk. An inexpensive way to build more bulk to the laminate structure is to increase the thickness of the extrusion layer rather than increase the thickness of other layers. Examples of the extruded substrate include LDPE, HDPE, and LLDPE.

Outer Substrate

The outer substrate of the flexible barrier package provides dimensional stability to the package and is a receptacle for ink. The outer substrate can be any material that forms a flexible barrier package having the properties described herein and a biobased content of at least about 95%, preferably at least about 97%, more preferably at least about 99%, for example, about 100%.

The outer substrate can be selected from the group consisting of consisting of polyethylene terephthalate (PET), HDPE, medium density polyethylene (MDPE), LDPE, LLDPE, PLA (e.g., from Natureworks), PHA, poly(ethylene-2,5-furandicarboxylate) (PEF), cellulose (available from, for example, Innovia), NYLON 11 (i.e., Rilsan® from Arkema), starch-based films, bio-polyesters, (e.g., those made from bio-glycerol, organic acid, and anhydride, as described in U.S. Patent Application No. 2008/0200591, incorporated herein by reference), polybutylene succinate, polyglycolic acid (PGA), polyvinyl chloride (PVC), and mixtures thereof. In some preferred embodiments, the outer substrate is selected from the group consisting of PET, PEF, LDPE, LLDPE, NYLON 11, and mixtures thereof.

Bio-polyethylene terephthalate is available from companies such as Teijin Fibers Ltd (30% renewable), Toyota Tshusho, Klockner. It also can be produced from the polymerization of bio-ethylene glycol with bio-terephthalic acid. Bio-ethylene glycol can be derived from renewable resources via a number of suitable routes, such as, for example, those described in WO/2009/155086 and U.S. Pat. No. 4,536,584, each incorporated herein by reference. Bio-terephthalic acid can be derived from renewable alcohols through renewable p-xylene, as described in WO/2009/079213, which is incorporated herein by reference. In some embodiments, a renewable alcohol (e.g., isobutanol) is dehydrated over an acidic catalyst in a reactor to form isobutylene. The isobutylene is recovered and reacted under the appropriate high heat and pressure conditions in a second reactor containing a catalyst known to aromatize aliphatic hydrocarbons to form renewable p-xylene. In another embodiment, a renewable alcohol, e.g. isobutanol, is dehydrated and dimerized over an acid catalyst. The resulting diisobutylene is recovered and reacted in a second reactor to form renewable p-xylene. In yet another embodiment, a renewable alcohol, e.g. isobutanol, containing up to 15 wt. % water is dehydrated, or dehydrated and oligomerized, and the resulting oligomers are aromatized to form renewable p-xylene. Renewable phthalic acid or phthalate esters can be produced by oxidizing p-xylene over a transition metal catalyst (see, e.g., Ind. Eng. Chem. Res., 39:3958-3997 (2000)), optionally in the presence of one or more alcohols.

Bio-poly(ethylene-2,5-furandicarboxylate) (bio-PEF) can be produced according to the route disclosed in Werpy and Petersen, "Top Value Added Chemicals from Biomass. Volume I—Results of Screening for Potential Candidates from Sugars and Synthesis Gas, produced by the Staff at Pacific Northwest National Laboratory (PNNL); National Renewable Energy Laboratory (NREL), Office of Biomass Program (EERE)," 2004 and PCT Application No. WO 2010/077133, which are incorporated herein by reference.

The outer substrate is present in a thickness of about 2.5 µm to about 300 µm, preferably about 7 µm to about 50 µm, more preferably about 8 µm to about 20 µm, even more preferably about 10 µm to about 15 µm. A thinner outer substrate results in a flexible barrier package with less stiffness. A thicker outer substrate results in a flexible barrier package with more stiffness, more dimensional stability for printing, and increased heat resistance during heat sealing.

In optional embodiments where ink is deposited on the outer substrate, the side of the substrate with ink deposition has a surface energy that is at least about 38 dynes/cm, preferably at least about 42 dynes/cm. Alternatively, the outer substrate can be treated to result in the desired surface energy using techniques known to one skilled in the art, such as corona treatment. If the surface energy is less than about 38 dynes/cm, the outer substrate will not accept printing inks on its surface.

Further, optional embodiments of the flexible package include a label placed onto the exterior of a package. The label can include a pressure sensitive adhesive label or a shrink sleeve label or other type of suitable label. The label is optionally printed and optionally contains artwork and or indicia.

Ink

In some embodiments, one or more layers of ink optionally can be deposited on either or both sides of the outer substrate. The ink is present in a thickness of about 1 µm to about 20 µm, preferably about 1 µm to about 10 µm, more preferably about 2.5 µm to about 3.5 µm even more preferably about 3 µm. The ink that is deposited can be any ink that is compatible with the materials it contacts. In some embodiments, the ink can be soy-based, plant-based, or a mixture thereof. Nonlimiting examples of inks include ECO-SURE!™ from Gans Ink & Supply Co. and the solvent-based VUTEk® and BioVu™ inks from EFI, which are derived completely from renewable resources (e.g., corn). In some embodiments, the ink is high abrasive resistant. For example, the high abrasive resistant ink can include coatings cured by ultraviolet radiation (UV) or electron beam (EB).

Lacquer

In aspects when ink is deposited on the exterior surface of the outer substrate, the exterior surface of the outer substrate optionally includes lacquer. The optional lacquer functions to protect the ink layer from its physical and chemical environment and may be derived from a renewable resource. The lacquer also can be formulated to optimize durability and glossy or matte finish. In some embodiments, the lacquer is selected from the group consisting of resin, additive, and solvent/water. In some preferred embodiments, the lacquer is a nitrocellulose-based lacquer, natural shellac, or mixtures thereof. The lacquer has a thickness of about 1 µm to about 10 µm, preferably about 1 µm to about 5 µm, more preferably about 2.5 µm to about 3.5 µm. The amount of lacquer present in multi-ply packages determines the level of protection of the underlying print layer. Although a thinner lacquer may crack or rub off, it dries and cures faster and is less expensive. A thicker lacquer is more expensive, but it adds more protection to the ink.

In aspects where the flexible barrier package is a single-ply package, the flexible barrier package comprises a sealant that has a thickness of about 5 µm to about 750 µm and a biobased content of at least about 85% and optionally a barrier material layer present. Ink is optionally deposited on the exterior surface of the sealant (or optional barrier material layer coating the sealant) and is present in a thickness of about 1 µm to about 20 µm, preferably about 1 µm to about 10 µm, more preferably about 2.5 µm to about 3.5 µm even more preferably about 3 µm. The ink optionally is coated with a lacquer, which is present in a thickness of about 1 µm to about 10 µm, preferably about 1 µm to about 5 µm, more preferably about 2.5 µm to about 3.5 µm. As previously described, the ink can be any ink that is compatible with the materials it contacts, and can be, for example, soy-based, plant-based, or a mixture thereof (e.g., ECO-SURE!, VUTEk®, and BioVu™). In some embodiments, the ink is high abrasive resistant, as previously described herein. The amount of lacquer present in single-ply packages adds rigidity to the packages, with the degree of rigidity increasing with the thickness of the lacquer.

Barrier Material Layer

In some embodiments, the flexible barrier package includes a barrier material layer deposited or laminated between the first tie layer and the outer substrate or deposited on the sealant layer. For example, the barrier material layer is deposited onto the sealant or ink layer (e.g., vacuum metallization, nanoclay coatings), deposited onto a polymer layer and then laminated between the first tie layer and the outer substrate (e.g., vacuum metalized polyethylene terephthalate), or directly laminated between the first tie layer and the outer substrate (e.g., foil). The barrier material layer functions to reduce the moisture vapor transmission rate (MVTR) into or out of the package, and also can serve to limit diffusion through the package wall of any diffusive species. Nonlimiting examples of diffusive species include $O_2$, $CO_2$, aroma, and perfume. The barrier material layer has a thickness of about 200 Å to about 50 µm, preferably about 200 Å to about 9 µm.

The barrier material layer can be can be any material that forms a flexible barrier package having the properties described herein. Examples of the barrier material layer include a metal, a metal oxide, a biobased polymer comprising a metal coating, a biobased polymer comprising a metal oxide coating, a nanoclay, a silica nanoparticle coating, a barrier polymer (e.g., bio-polyglycolic acid (PGA) from bio-glycolic acid monomer as produced by METabolic EXplorer), a diamond-like carbon coating, a polymer matrix having a filler, a whey layer and mixtures thereof. The polymer matrix having a filler can be composed of any barrier polymer and any filler, in any amount, as long as the resulting flexible barrier package has the mechanical properties described herein. In exemplary embodiments, the metal, metal oxide, metal coating, or metal oxide coating is selected from the group consisting of a foil, metallized biaxially-oriented polypropylene (mBOPP), metalized PET (mPET), metalized polyethylene (mPE), aluminum, an aluminum oxide, a silicon oxide, and mixtures thereof. In some embodiments, the mBOPP, mPET, and mPE contain bio-polypropylene, bio-PET, and bio-polyethylene, respectively. In exemplary embodiments, the filler is selected from the group consisting of a nanoclay, graphene, graphene oxide, graphite, calcium carbonate, starch, wax, mica, Kaolin, feldspar, glass fibers, glass spheres, glass flakes, cenospheres, a silica, a silicate, cellulose, cellulose acetate, and mixtures thereof. In exemplary embodiments, the nanoclay is selected from the group consisting of montmorillonites, bentonite, vermiculite platelets, hallosite, cloisite, smectite, and mixtures thereof. Examples of the barrier material layer are disclosed in U.S. Pat. Nos. 7,233,359, and 6,232,389, and WO/2009/032748, each incorporated herein by reference. Materials that can be used for the barrier material layer are commercially available as NANOLOK™ from Inmat.

The exact composition and thickness of the barrier material layer is determined by the intended use of the flexible barrier package, and the sensitivity of the consumer product within the flexible barrier package to gaining or losing a certain material. For example, if the flexible barrier package encloses a shampoo, a critical amount of water loss from the shampoo will severely impact its performance. Based on the projected time that the package is expected to remain in the trade, a desired shelf life or expiration date is defined. With the known acceptable amount of water loss, length of time in the trade, and package size, an acceptable flux of water is then defined. The barrier material layer composition and barrier material layer thickness is then chosen based on the particular performance criteria and characteristics of each consumer product that is enclosed within the flexible barrier package.

The barrier material layer is coated on both sides with a second tie layer that includes an adhesive, as previously described herein. The second tie layer has a thickness of about 1 µm to about 20 µm, preferably about 1 µm to about 10 µm, more preferably about 2.5 µm to about 3.5 µm. As previously described herein, the adhesive can be a solvent adhesive or a solventless adhesive.

In some embodiments, the flexible barrier packages contain a consumer product, such as a liquid or a powder. As used herein, "consumer product" refers to materials that are used for hair care, beauty care, oral care, health care, personal cleansing, and household cleansing, for example. Nonlimiting examples of consumer products include food, drink, wipes, shampoo, conditioner, skin lotion, shave lotion, liquid soap, bar soap, toothpaste, mousse, face soap, hand soap, body soap, moisturizer, shave lotion, mouthwash, hair gel, hand sanitizer, laundry detergent, dish detergent, dishwashing machine detergent, cosmetics, and over-the-counter medication. The flexible barrier packages are resistant to the consumer product. As used herein, "resistant" refers to the ability of the flexible barrier packages to maintain their mechanical properties and artwork on their surfaces, as designed, without degradation from consumer product interaction and diffusion or leakage of the consumer product through or from the flexible barrier package.

Assessment of the Biobased Content of Materials

As used herein, "biobased content" refers to the amount of bio-carbon in a material as a percent of the weight (mass) of the total organic carbon in the product. For example, polyethylene contains two carbon atoms in its structural unit. If ethylene is derived from a renewable resource, then a homopolymer of polyethylene theoretically has a biobased content of 100% because all of the carbon atoms are derived from a renewable resource. A copolymer of polyethylene could also theoretically have a biobased content of 100% if both the ethylene and the co-monomer are each derived from a renewable resource. In embodiments where the co-monomer is not derived from a renewable resource, the HDPE will typically include only about 1 wt % to about 2 wt. % of the non-renewable co-monomer, resulting in HDPE having a theoretical biobased content that is slightly less than 100%. As another example, polyethylene terephthalate contains ten carbon atoms in its structural unit (i.e., two from the ethylene glycol monomer and eight from the terephthalic acid monomer). If the ethylene glycol portion is derived from a renewable resource, but the terephthalic acid is derived from a petroleum-based resource, the theoretical biobased content of the polyethylene terephthalate is 20%.

A suitable method to assess materials derived from renewable resources is through ASTM D6866-12, which allows the determination of the biobased content of materials using radiocarbon analysis by accelerator mass spectrometry, liquid scintillation counting, and isotope mass spectrometry. When nitrogen in the atmosphere is struck by an ultraviolet light produced neutron, it loses a proton and forms carbon that has a molecular weight of 14, which is radioactive. This $^{14}C$ is immediately oxidized into carbon dioxide, which represents a small, but measurable fraction of atmospheric carbon. Atmospheric carbon dioxide is cycled by green plants to make organic molecules during the process known as photosynthesis. The cycle is completed when the green plants or other forms of life metabolize the organic molecules producing carbon dioxide, which causes the release of carbon dioxide back to the atmosphere. Virtually all forms of life on Earth depend on this green plant production of organic molecules to produce the chemical energy that facilitates growth and reproduction. Therefore, the $^{14}C$ that exists in the atmosphere becomes part of all life forms and their biological products. These renewably based organic molecules that biodegrade to carbon dioxide do not contribute to global warming because no net increase of carbon is emitted to the atmosphere. In contrast, fossil fuel-based carbon does not have the signature radiocarbon ratio of atmospheric carbon dioxide. See WO/2009/155086, incorporated herein by reference.

The application of ASTM D6866-12 to derive a "biobased content" is built on the same concepts as radiocarbon dating, but without use of the age equations. The analysis is performed by deriving a ratio of the amount of radiocarbon ($^{14}C$) in an unknown sample to that of a modern reference standard. The ratio is reported as a percentage with the units "pMC" (percent modern carbon). If the material being analyzed is a mixture of present day radiocarbon and fossil carbon (containing no radiocarbon), then the pMC value obtained correlates directly to the amount of biomass material present in the sample.

The modern reference standard used in radiocarbon dating is a NIST (National Institute of Standards and Technology) standard with a known radiocarbon content equivalent approximately to the year AD 1950. The year AD 1950 was chosen because it represented a time prior to thermo-nuclear weapons testing, which introduced large amounts of excess radiocarbon into the atmosphere with each explosion (termed "bomb carbon"). The AD 1950 reference represents 100 pMC.

"Bomb carbon" in the atmosphere reached almost twice normal levels in 1963 at the peak of testing and prior to the treaty halting the testing. Its distribution within the atmosphere has been approximated since its appearance, showing values that are greater than 100 pMC for plants and animals living since AD 1950. The distribution of bomb carbon has gradually decreased over time, with today's value being near 107.5 pMC. As a result, a fresh biomass material, such as corn, could result in a radiocarbon signature near 107.5 pMC.

Petroleum-based carbon does not have the signature radiocarbon ratio of atmospheric carbon dioxide. Research has noted that fossil fuels and petrochemicals have less than about 1 pMC, and typically less than about 0.1 pMC, for example, less than about 0.03 pMC. However, compounds derived entirely from renewable resources have at least about 95 percent modern carbon (pMC), preferably at least about 99 pMC, for example, about 100 pMC.

Combining fossil carbon with present day carbon into a material will result in a dilution of the present day pMC content. By presuming that 107.5 pMC represents present day biomass materials and 0 pMC represents petroleum derivatives, the measured pMC value for that material will reflect the proportions of the two component types. A material derived 100% from present day soybeans would give a radiocarbon signature near 107.5 pMC. If that material was diluted with 50% petroleum derivatives, it would give a radiocarbon signature near 54 pMC.

A biobased content result is derived by assigning 100% equal to 107.5 pMC and 0% equal to 0 pMC. In this regard, a sample measuring 99 pMC will give an equivalent biobased content result of 93%.

Assessment of the materials described herein were done in accordance with ASTM D6866-12, particularly with Method B. The mean values quoted in this report encompasses an absolute range of 6% (plus and minus 3% on either side of the biobased content value) to account for variations in end-component radiocarbon signatures. It is presumed that all materials are present day or fossil in origin and that the desired result is the amount of bio-component "present" in the material, not the amount of bio-material "used" in the manufacturing process.

Other techniques for assessing the biobased content of materials are described in U.S. Pat. Nos. 3,885,155, 4,427,884, 4,973,841, 5,438,194, and 5,661,299, WO 2009/155086, each incorporated herein by reference.

Characterization

Shelf Life

The flexible barrier packages described herein have a shelf life of at least about one year, preferably at least about two years. As used herein, "shelf life" refers to a time period when the flexible barrier package maintains its original design-intended properties and appearance, without deteriorating or becoming unsuitable for use. A failure to maintain original designed-intended properties and appearance would include product leakage through the heat seal area or product seepage through the flexible barrier package laminate layers, ink bleeding, ink fade, delamination of the laminate, or a chemical reaction between the flexible barrier package and a consumer product contained with the package that leads to decreased efficacy of the consumer product. During the shelf life of the flexible barrier package, the physical and chemical integrity of the flexible barrier package are maintained throughout storage, shipment, and consumer use. Additionally, the appearance of the package (e.g., artwork fidelity and package integrity) is maintained.

The shelf life of the flexible barrier package can be tested by placing the flexible barrier package into a constant temperature, constant humidity room for a particular amount of time and then inspecting the packages for failure, as exemplified by leakage, unacceptable loss of materials beyond a marked weight, ink fading, ink bleed, or package delamination. High temperatures are used in an attempt to accelerate the aging process and can be used to predict longer term stability and chemical effects at non-accelerated conditions. These data may be used to set shelf life at ambient temperature. For example, one skilled in the art assumes that the rate of aging may be accelerated two-fold for each ten degrees centigrade increase in temperature, as would be the case using the Arrhenius rate law. Thus, a flexible barrier package placed in a room at 50% relative humidity (RH) and 55° C. for two months, is assumed to be equivalent to a flexible barrier package at 50% RH and 25° C. for 16 months. After the accelerated aging process, the flexible barrier package is tested for weight loss and leakage, and the artwork is inspected for discoloration, bleeding, and the like. If the flexible barrier package has physical properties or appearance that is reduced beyond a consumer acceptable level, then the flexible barrier package is considered a failure. The consumer acceptable level is an easily observable change in a physical or mechanical property of the package, such as ink bleed, delamination, and/or color change that would be noticed by a consumer when selecting the product in a store and in comparison to a reference.

In some embodiments, such as when the flexible barrier package is a single-ply package that does not include ink, the package exhibits a mass loss of less than about 1 wt. %, based on the total weight of the package, when it is filled to three-quarters of its volume with a laundry powder a (i.e., about 30 wt. % of soda ash, about 67 wt. % of zeolite, about 1.5 wt. % of methyl anthranilate, and about 1.5 wt. % of ethyl acetate, based on the total weight of the composition), sealed, and placed in a room at 50% relative humidity (RH) at 55° C. for at least about one month, preferably at least about two months, more preferably at least about 3 months, even more preferably at least about 4 months, and then weighed, placed on a standard vibration table, subjected to 1 hour of cycled vibrations ramped at 1 Hz/min from 0 to about 60 Hz, followed by 1 hour ramped at 1 Hz/min from about 60 Hz to 0 Hz, and then reweighed.

Moisture Vapor Transmission Rate

The flexible barrier packages described herein have a moisture vapor transmission rate (MVTR) that minimizes the transfer of moisture through the flexible barrier package either to the outside environment, or to a consumer product inside the flexible barrier package. The MVTR is the steady state rate at which water vapor permeates through a film at specified conditions of temperature and relative humidity, and can be determined using ASTM F1249-13. When the consumer product is a liquid, the MVTR of the flexible barrier package prevents moisture loss from the liquid to the outside environment. When the consumer product is a powder or article (e.g., a baby diaper), the MVTR of the flexible barrier package prevents absorption of moisture into the powder or article from the outside environment.

A flexible barrier package described herein has a MVTR of less than about 10 grams per square meter per day ($g/m^2/day$), preferably less than about 5 $g/m^2/day$, more preferably less than about 2 $g/m^2/day$, even more preferably less than about 1 $g/m^2/day$, still more preferably less than about 0.6 $g/m^2/day$, for example, less than about 0.4 $g/m^2/day$ or less than about 0.2 $g/m^2/day$, at about 37° C. and about 90% relative humidity (RH), as determined by ASTM F1249-13. In some embodiments when the flexible barrier package encloses a powder, the MVTR is less than about 10 $g/m^2/day$, preferably less than about 5 $g/m^2/day$, more preferably less than about 2 $g/m^2/day$, for example, less than about 1 $g/m^2/day$ at about 37° C. and about 90% RH, as determined by ASTM F1249-13. In some embodiments when the flexible barrier package encloses a liquid, the MVTR is less than about 2 $g/m^2/day$, preferably less than about 1 $g/m^2/day$, more preferably less than about 0.6 $g/m^2/day$, for example, less than about 0.4 $g/m^2/day$ or less than about 0.2 $g/m^2/day$ at about 37° C. and about 90% RH, as determined by ASTM F1249-13. The MVTR of the flexible barrier packages described herein can be tuned by adjusting the composition and thickness of the sealant, outer substrate, optional extruded substrate, and/or optional barrier material layer. For example, the MVTR decreases as the thickness of the sealant increases when there is no other barrier present, and in particular, the MVTR decreases as barrier material layer increases or as the barrier layer has a lower MVTR.

Tensile Modulus

The flexible barrier packages described herein also can be characterized by tensile modulus. Tensile modulus is the stress divided by the strain in the linear region of the stress strain curve. In some embodiments, the tensile modulus of the flexible barrier packages can be determined by ASTM D882-12, using a 15.0 or 25.4 mm wide film, a grip gap of about 50 mm, and a crosshead speed of about 300 m/min. In some embodiments, the flexible barrier packages of the invention have a tensile modulus between about 140 MPa and about 4140 MPa. If the tensile modulus of the flexible barrier packages is too low, then it may break or distort on the film converting lines when the film is under tension.

Kinetic Coefficient of Friction

The kinetic coefficient of friction is a dimensionless scalar value that describes the ratio of the force of friction between two bodies in relative motion to each other, and the force pressing them together. The kinetic coefficient of friction can be determined by ASTM D1894-11$^{\epsilon 1}$. In some embodiments, the flexible barrier packages of the invention have a kinetic coefficient of friction between each of the sealant and the sealant of a second package and the outer substrate and the outer substrate of a second package of no greater than about 0.5, preferably no greater than about 0.4, more preferably no greater than about 0.2 between two layers of the flexible barrier package at a sled weight of about 200 g and a crosshead speed of about 150 mm/min. For example, flexible barrier packages of the invention can have a kinetic coefficient of friction of about 0.1 to about 0.5, or about 0.2 to about 0.5 or about 0.1 to about 0.4 between two layers of the flexible barrier package at a sled weight of about 200 g and a crosshead speed of about 150 mm/min. If the kinetic coefficient of friction is too high, then the film will not run properly on the film converting lines.

Static Coefficient of Friction

The static coefficient of friction is the friction between two solid objects that are not moving relative to each other. The static friction force must be overcome by an applied force before an object can move. The static coefficient of friction between each of the sealant and the sealant of a second package and the outer substrate and the outer substrate of a second package can be determined by ASTM D1894-11$^{e1}$. In some embodiments, the flexible barrier packages of the invention have a static coefficient of friction of no greater than about 0.5, preferably no greater than about 0.4, more preferably no greater than about 0.2 between two layers of the flexible barrier package at a sled weight of about 200 g and a crosshead speed of about 150 mm/min. If the static coefficient of friction is too high, then the film will not run properly on the film converting lines.

Maximum Load

Maximum load is the maximum amount of force the films can tolerate before breaking. In some embodiments, the flexible barrier packages described herein can withstand a maximum load of about 50 N in cross direction (CD) and about 65 N in machine direction (MD), as determined by ASTM D882-12. If the maximum load is too low, then the film will break when under tension on film converting lines.

Lamination Strength

Laminates are made by bonding together two or more layers or plies of material or materials. Their performance is often dependent on the ability of the laminate to function as a single unit. If the plies have not been properly bonded together, the performance may be adversely affected. In some embodiments, the flexible barrier packages described herein exhibit a lamination strength of sealant to outer substrate of at least about 1 N, at least about 2 N, at least about 3 N, at least about 4 N, at least about 5 N, at least about 6 N, or at least about 7 N per 25.4 mm of sample width, as determined by ASTM F904-98 (2008). In some embodiments, the flexible barrier packages described herein exhibit a lamination strength of sealant to outer substrate to each other of at least about 7 N, at least about 8 N, or at least about 9 N per 15 mm of sample width, as determined by ASTM F904-98 (2008).

The packages described herein that comprise an outer substrate but do not comprise a barrier material layer (e.g., the packages represented by FIGS. 1, 2, and 4) exhibit a lamination strength of sealant to outer substrate of at least about 1.0 N, preferably at least about 2N, more preferably at least about 3N, even more preferably at least about 4N per 25.4 mm of sample width, as determined by ASTM F904-98 (2008), after the package is filled to three-quarters of its volume with a laundry powder α and placed in a room at 50% relative humidity (RH) at 55° C. for at least about one month, preferably at least about two months, more preferably at least about 3 months, even more preferably at least about 4 months.

| Laundry Powder α | |
|---|---|
| Component | Amount (wt. %) |
| Soda ash | about 30.0 |
| Zeolite | about 67.0 |
| Methyl anthranilate | about 1.5 |
| Ethyl acetate | about 1.5 |

Laundry power α is prepared by mixing together the soda ash and zeolite in an appropriately-sized vessel with an appropriate mixer, and then slowly dripping in the methyl anthranilate (liquid) and ethyl acetate. The resulting powder is immediately packed into a flexible barrier package described herein and the package is heat sealed according to methods known to one skilled in the art.

The packages described herein that comprise both an outer substrate and a barrier material layer (e.g., the package represented by FIG. 3), after they are filled to three-quarters of their volume with a shampoo β and placed in a room at 50% relative humidity (RH) at 55° C. for at least about one month, preferably at least about two months, more preferably at least about 3 months, even more preferably at least about 4 months, exhibit (i) a lamination strength of sealant to outer substrate of at least about 1.0 N, preferably at least about 2 N, more preferably at least about 3 N, even more preferably at least about 4 N per 25.4 mm of sample width, as determined by ASTM F904-98 (2008); (ii) a lamination strength between the sealant and the barrier material layer of at least about 1.0 N, preferably at least about 2 N, more preferably at least about 3 N, even more preferably at least about 4 N per 25.4 mm of sample width, as determined by ASTM F904-98 (2008); and, (iii) a lamination strength between the barrier material layer and the outer substrate of at least about 1.0 N, preferably at least about 2 N, more preferably at least about 3 N, even more preferably at least about 4 N per 25.4 mm of sample width, as determined by ASTM F904-98 (2008)

| Shampoo β | |
|---|---|
| Component | Amount (wt. %) |
| Ammonium laureth-3 sulfate | about 10.0 |
| Ammonium lauryl sulfate | about 6.0 |
| Cetyl alcohol | about 0.6 |
| Sodium chloride | about 0.7 |
| Sodium citrate dihydrate | about 0.4 |
| Citric acid | about 0.15 |
| Methyl anthranilate | about 1.5 |
| Ethyl acetate | about 1.5 |
| Water | about 20.85 |

Shampoo β is prepared by adding the distilled water to an appropriate vessel and stiffing it at an appropriate speed (e.g., about 100 to about 200 rpm) using an appropriately sized stir blade. The citric acid solution is added to the vessel, followed by the ammonium laureth-3 sulfate and ammonium lauryl sulfate. The resulting mixture is heated to 60° C. and cetyl alcohol is added to it with stirring. Stirring continues until the mixture is homogeneous. The mixture is then cooled to room temperature and the methyl anthranilate and ethyl acetate are added to it with stirring. The pH of the resulting solution is adjusted as needed to 5.5 using either 1.0 M HCl (aq.) or 1.0 M NaOH (aq.). The resulting shampoo is immediately packed into a package described herein and the package is heat sealed according to methods known to one skilled in the art.

Abrasion Resistance

The packages described herein that do not comprise an outer substrate (e.g., the package represented by FIG. 5) can be characterized using ASTM D5264-98. This method tests the abrasion resistance of printed materials using the Sutherland rub tester. Abrasion damage can occur during shipment, storage, handling, and end use. The result is a significant decrease in product appearance and legibility of product information. The packages described herein that do not contain an outer substrate exhibit no ink transfer to a probe, as determined by ASTM D5264-98, after the package is filled to three-quarters of its volume with laundry powder a, as previously described, and placed in a room at 50% relative humidity (RH) at 55° C. for at least about one month, preferably at least about two months, more preferably at least about 3 months, even more preferably at least about 4 months, using a four pound weight set for five strokes.

Heat Seal Strength

Heat seal strength is the peak force at which a heat seal can be separated. The heat seal strength can be measured by ASTM F88/F88M-09 using 15 or 25.4 mm width cut strips, a pressure of about 2.5 bar, a dwell time of about 0.5 seconds, a crosshead speed of 200 mm/min or 300 mm/min, and a temperature of about 60° C. to about 200° C., or about 140° C. to about 180° C. In some embodiments, the flexible barrier packages of the invention exhibit a heat seal strength of at least about 55 N (e.g., at least about 65 N, at least about 75 N, at least about 85 N, at least about 95 N) per 25.4 mm width using a heat sealing temperature of about 60° C. to about 200° C. In some embodiments, the flexible barrier packages of the invention exhibit a heat seal strength of at least about 35 N (e.g., at least about 45 N, at least about 55 N, at least about 65 N, at least about 75 N) per 15 mm width using a heat sealing temperature of about 60° C. to about 200° C. If the heat seal strength is too low, then the contents may leak from the flexible barrier package.

Method of Making

The flexible barrier packages described herein are produced by lamination. Lamination involves joining together two or more individual films into a multi-ply structure, providing a combination of properties. The outside layer of a laminate (i.e., outer substrate) provides abrasion resistance, heat resistance for sealing and a high level of aesthetics (usually via reverse printing). The core layer (i.e., sealant) often provides improved barrier properties, while an inside layer (e.g., first tie layer) provides a means to join the structure together.

Adhesive lamination is well known to one skilled in the art. Methods of making packages using adhesive lamination are described in U.S. Pat. No. 3,462,239 and US 2006/0003122, each incorporated herein by reference.

Extrusion lamination is also well known to one skilled in the art. In extrusion lamination, the different layers are adhered together by casting a thin layer of molten plastic (i.e., extruded substrate) between the film layers (e.g., sealant and outer substrate), by methods known to one skilled in the art. Additionally, two or more layers can be extruded directly onto a substrate to result in a multilayer film. Methods of making packages using extrusion lamination are described in U.S. Pat. No. 7,281,360, incorporated herein by reference.

Heat sealing is a process where a heated jaw is used to bring two film sealant layers together under pressure and melt them together forming a robust seal. Heat sealing of films is routinely conducted in packaging labs, manually using horizontal or vertically arranged jaws to form a package from flexible packaging film, and also to seal the package closed after filling it with product. There are three variables to consider when heat sealing a film: the temperature of the heated jaws, the sealing pressure used to bring the two films together, and the seal time. Together, these variables provide the length of time need to hold the sealant layers together under pressure and heat. The seal temperature depends on the melting point and sealing window of the particular sealant in use. Seal pressures are generally just enough to provide good mechanical contact of the two films (e.g., about 2 bar). The seal time can vary as needed for an adequate seal strength, typically about 1 to about 3 seconds.

Exemplary Embodiments

In some exemplary embodiments, the flexible barrier package is a 2-ply package, as depicted in FIG. 1, wherein the sealant is selected from the group consisting of LLDPE, LDPE, HDPE, starch, and mixtures thereof; and the outer substrate is selected from the group consisting of PET, PEF, cellulose, PHA, PLA, and mixtures thereof. In these embodiments, the package exhibits a MVTR of no more than about 1.8 g/m$^2$/day at 37.8° C., and 100% relative humidity (RH), as determined by ASTM F1249-13; a kinetic coefficient of friction between each of the sealant and the sealant of a second package, and the outer substrate and the outer substrate of a second package of no greater than about 0.4 at a sled weight of about 200 g and a crosshead speed of about 150 mm/min, as determined by ASTM D1894-11$^{\epsilon 1}$; a lamination strength of sealant to outer substrate of about 5 N per 25.4 mm of sample width, as determined by ASTM F904-98 (2008); and a heat seal strength of at least about 55 N per 25.4 mm width, as determined by ASTM F88/F88M-09, using a heat sealing temperature of about 140° C. to about 180° C. Further, these flexible barrier packages can withstand a maximum load of about 50 N in cross direction (CD) and about 65 N in machine direction (MD), as determined by ASTM D882-12. For example, the flexible barrier package can include a sealant composed of LDPE in a thickness of about 50 µm, a first tie layer that includes a solvent adhesive in a thickness of about 3 µm, and an outer substrate composed of PET in a thickness of about 12 µm, upon which ink is deposited in a thickness of about 3 µm.

In other exemplary embodiments, the flexible barrier package is a 3-ply package, as depicted in FIG. 3, wherein the sealant is selected from the group consisting of LDPE, LLDPE, HDPE, ULDPE, and mixtures thereof; the outer substrate is selected from the group consisting of PET, PEF, and mixtures thereof; and the barrier material layer is selected from the group consisting of foil, mBOPP, and metalized-PET. In these embodiments, the flexible barrier package exhibits a MVTR of no more than about 0.9 g/m$^2$/day after 5 cycle flexing, as determined by ASTM F1249-13; a kinetic coefficient of friction between the barrier material layer and the outer substrate of about 0.2 to about 0.5 in the machine direction at a sled weight of about 200 g and a crosshead speed of about 150 mm/min, as determined by ASTM D1894-11$^{\epsilon 1}$; and a lamination strength greater than about 1.6 N per a 25.4 mm sample width between the sealant and the barrier material layer, and greater than about 2.5 N per a 25.4 mm sample width between the barrier material layer and the outer substrate with a crosshead speed of 250 mm, as determined by ASTM F904-98 (2008). For example, the flexible barrier package can include a sealant composed of LDPE and LLDPE in a thickness of about 40 µm, a first tie layer that includes an adhesive in a thickness of about 3 µm; a barrier material layer composed of metalized biaxially oriented polypropylene (mBOPP) in a thickness of about 18 µm; a second tie layer that includes an adhesive in a thickness of about 2 µm; and an outer substrate composed of PET in a thickness of about 12 µm, upon which ink is reverse printed.

In further exemplary embodiments, the flexible barrier package is a 2-ply package, as depicted in FIG. 1, wherein the sealant is selected from the group consisting of LLDPE, LDPE, HDPE, and mixtures thereof; and the outer substrate is selected from the group consisting of LDPE, LLDPE, HDPE, and mixtures thereof. In these embodiments, the flexible barrier package exhibits a kinetic coefficient of friction between each of the sealant and the sealant of a second package, and the outer substrate and the outer substrate of a second package of no greater than about 0.2 at a sled weight of about 200 g and a crosshead speed of about 150 mm/min, as determined by ASTM D1894-11$^{e1}$; a lamination strength of sealant to outer substrate of greater than about 4 N per 25.4 mm of sample width, as determined by ASTM F904-98 (2008); and a heat seal strength of at least 25 N per 25.4 mm width, as determined by ASTM F88/F88M-09, using a heat sealing temperature of about 140° C., a seal pressure of about 3 bar, and a seal time of about 0.5 seconds. Further, these flexible barrier packages can withstand a maximum load of about 50 N in cross direction (CD) and about 65 N in machine direction (MD), as determined by ASTM D882-12. For example, the flexible barrier package can include a sealant composed of LDPE and LLDPE in a thickness of about 30 µm, a first tie layer that includes an adhesive in a thickness of about 3 µm, and an outer substrate composed of LDPE and LLDPE in a thickness of about 70 µm, upon which ink is deposited.

In still other exemplary embodiments, the flexible barrier package is a 2-ply package, as depicted in FIG. 1, wherein the sealant is selected from the group consisting of LDPE, LLDPE, HDPE, and mixtures thereof; and the outer substrate is nylon. In these embodiments, the flexible barrier package exhibits a lamination strength of sealant to outer substrate of at least about 7 N per 15 mm of sample width, as determined by ASTM F904-98 (2008); and a heat seal strength of about 35.3 N per 15 mm at about 300 mm/min, as determined by ASTM F88/F88M-09. For example, the flexible barrier package can include a sealant composed of LLDPE in a thickness of about 100 µm, a first tie layer that includes an adhesive in a thickness of about 3 µm, and an outer substrate composed of nylon in a thickness of about 15 µm that is reverse printed with ink.

In further exemplary embodiments, the flexible barrier package is a 2-ply package as depicted in FIG. 4, wherein the sealant is selected from the group consisting of LDPE, LLDPE, HDPE, and mixtures thereof; the outer substrate is selected from the group consisting of PET, PEF, and mixtures thereof; and the extruded substrate is selected from the group consisting of LDPE, LLDPE, HDPE, and mixtures thereof. In these embodiments, the package exhibits a static coefficient of friction of about 0.1 to about 0.4 between each of the sealant and the outer substrate, and the outer substrate and the outer substrate of a second package at a sled weight of about 200 g and a crosshead speed of about 150 mm/min, as determined by ASTM D1894-11$^{e1}$; a lamination strength of each of the sealant to extruded substrate and the extruded substrate to outer substrate of at least about 1.7 N per 25.4 mm of sample width, as determined by ASTM F904-98 (2008); and a heat seal strength of at least about 30 N per 25.4 mm width, as determined by ASTM F88/F88M-09, using a heat sealing temperature of about 130° C., a pressure of about 3 bar, and a sealing time of about 1.5 seconds. For example, the flexible barrier package can include a sealant composed of LDPE and LLDPE in a thickness of about 60 µm, extruded substrate composed of LDPE in a thickness of about 20 µm, and a sealant composed of PET in a thickness of about 12 µm.

Alternative Embodiments

In some alternative embodiments to any of the embodiments described herein, the sealant, outer substrate, extruded substrate, barrier material, first tie layer, second tie layer, or mixtures thereof include recycled material in place of or in addition to biobased material in an amount of up to 100% of the biobased material. As used herein, "recycled" materials encompass post-consumer recycled (PCR) materials, post-industrial recycled (PIR) materials, and a mixture thereof.

In these alternative embodiments, for example, the sealant can include no more than about 10 wt. % of virgin, petroleum-based material, based on the total weight of the sealant. The first tie layer can include an adhesive that is composed of no more than about 5 wt. % of virgin, petroleum-based material, based on the total weight of the adhesive. The outer substrate can include no more than about 5 wt. % of virgin, petroleum-based material, based on the total weight of the outer substrate. The optional extruded substrate can include no more than about 15 wt. % of virgin, petroleum-based material, based on the total weight of the extruded substrate.

The non-virgin, petroleum based material for each of these components (e.g., the sealant, outer substrate, extruded substrate, barrier material, first tie layer, second tie layer, or mixtures thereof) can be composed of biobased material, recycled material, or a mixture thereof. For example, if the sealant includes no more than about 10 wt. % of virgin, petroleum-based material, the at least about 90 wt. % of non-virgin, petroleum-based material can include 0 wt. % to about 90 wt. % of biobased material and 0 wt. % to about 90 wt. % of recycled material, based on the total weight of the sealant (e.g., 10 wt. % of biobased material and 80 wt. % of recycled material, or about 20 wt. % of biobased material and about 70 wt. % of recycled material, or about 30 wt. % of biobased material and about 60 wt. % of recycled material, or about 40 wt. % of the biobased material and about 50 wt. % of the recycled material, or about 50 wt. % of the biobased material and about 40 wt. % of the recycled material, or about 60 wt. % of the biobased material and about 30 wt. % of the recycled material, or about 70 wt. % of the biobased material and 20 wt. % of the recycled material, or about 80 wt. % of the biobased material and about 10 wt. % of the recycled material, based on the total weight of the sealant).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A flexible barrier package comprising:
   (a) a sealant having a thickness of about 1 μm to about 750 μm and a biobased content of at least about 85%;
   (b) a first tie layer coating the sealant, the first tie layer comprising an adhesive having a thickness of about 1 μm to about 20 μm; and,
   (c) an outer substrate having a thickness of about 2.5 μm to about 300 μm and a biobased content of at least about 95% laminated to the sealant via the first tie layer;
   wherein the package exhibits a lamination strength of sealant to outer substrate of at least about 1.0 N per 25.4 mm of sample width after the package is filled to three-quarters of its volume with a laundry powder composition a and placed in a room at 50% relative humidity (RH) at 55° C. for at least about one month.

2. The flexible barrier package of claim 1 further comprising ink deposited on the exterior surface, the interior surface, or both, of the outer substrate, and having a thickness of about 1 μm to about 20 μm.

3. The flexible barrier package of claim 2 comprising ink deposited on the exterior surface of the outer substrate and a lacquer coating the exterior surface of the outer substrate in a thickness of about 1 μm to about 10 μm.

4. The flexible barrier package of claim 1 further comprising a barrier material layer that is either deposited onto the first tie layer or laminated between the first tie layer and the outer substrate, wherein the barrier material layer has a thickness of about 200 Å to about 50 μm, and is coated with a second tie layer having a thickness of about 1 μm to about 20 μm, wherein the package, after it filled to three-quarters of its volume with a shampoo β and placed in a room at 50% relative humidity (RH) at 55° C. for at least about one month, exhibits:
   (i) a lamination strength between the sealant and the outer substrate of at least about 1.0 N per 25.4 mm of sample width;
   (ii) a lamination strength between the sealant and the barrier material layer of at least about 1.0 N per 25.4 mm of sample width; and,
   (iii) a lamination strength between the barrier material layer and the outer substrate of at least about 1.0 N per 25.4 mm of sample width.

5. The flexible barrier package of claim 1 further comprising a barrier material layer that is either deposited onto the sealant or laminated between the sealant and the outer substrate, wherein the barrier material layer has a thickness of about 200 Å to about 50 μm, and is coated with a tie layer having a thickness of about 1 μm to about 20 μm, wherein the package, after it filled to three-quarters of its volume with a shampoo β and placed in a room at 50% relative humidity (RH) at 55° C. for at least about one month, exhibits:
   (i) a lamination strength between the sealant and the outer substrate of at least about 1.0 N per 25.4 mm of sample width;
   (ii) a lamination strength between the sealant and the barrier material layer of at least about 1.0 N per 25.4 mm of sample width; and,
   (iii) a lamination strength between the barrier material layer and the outer substrate of at least about 1.0 N per 25.4 mm of sample width.

6. The flexible barrier package of claim 1, wherein the first tie layer further comprises an extruded substrate having a thickness of about 1 μm to about 750 μm, and a biobased content of at least about 85%.

7. The flexible barrier package of claim 1, wherein the biobased content of the sealant is at least about 90% and the biobased content of the outer substrate is at least about 97%.

8. The flexible barrier package of claim 6, wherein the biobased content of the sealant is at least about 95% and the biobased content of the outer substrate is at least about 99%.

9. A flexible barrier package comprising a sealant having a thickness of about 5 μm to about 750 μm and a biobased content of at least about 85%; wherein the package exhibits a mass loss of less than about 1 wt. %, based on the total weight of the package, when it is filled to three-quarters of its volume with a laundry powder a, sealed, and placed in a room at 50% relative humidity (RH) at 55° C. for at least about one month, and then weighed, and placed on a standard vibration table, subjected to 1 hour of cycled vibrations ramped at 1 Hz/min from 0 to about 60 Hz, followed by 1 hour ramped at 1 Hz/min from about 60 Hz to 0 Hz, and then reweighed.

10. The flexible barrier package of claim 8 further comprising ink deposited on the exterior surface of the sealant having a thickness of about 1 μm to about 20 μm, wherein the package exhibits no ink transfer to a probe, using a four pound weight set for five strokes, after the package is filled to three-quarters of its volume with a laundry powder composition a and placed in a room at 50% relative humidity (RH) at 55° C. for at least about one month.

11. The flexible barrier package of claim 8 further comprising a barrier material layer deposited on the exterior surface of the sealant.

12. The flexible barrier package of claim 9 further comprising a lacquer coating the exterior surface of sealant in a thickness of about 1 μm to about 750 μm.

13. The flexible barrier package of claim 1 wherein the package comprises a moisture vapor transmission rate (MVTR) of less than about 10 grams per square meter per day (g/m²/day), a tensile modulus of about 140 MPa to about 4140 MPa, or both.

14. The flexible barrier package of claim 1, wherein the sealant is selected from the group consisting of high density polyethylene (HDPE), low density polyethylene (LDPE), linear low density polyethylene (LLDPE), ultra low linear low density polyethylene (ULDPE), polyhydroxyalkanoate (PHA), a starch-based film, a starch blended with a polyester, polybutylene succinate, polyglycolic acid (PGA), polyvinyl chloride (PVC), and mixtures thereof.

15. The flexible barrier package of claim 12, wherein the sealant further comprises paper, which is coated by the sealant.

16. The flexible barrier package of claim 12, wherein the sealant is selected from the group consisting of HDPE, LDPE, LLDPE, ULDPE, and mixtures thereof.

17. The flexible barrier package of claim 1, wherein the sealant comprises an additive selected from the group consisting of a slip agent, a filler, an antistatic agent, a pigment, a UV inhibitor, a biodegradable-enhancing additive, an anti-coloring agent, and mixtures thereof.

18. The flexible barrier package of claim 15, wherein the additive is selected from the group consisting of a euracamide, a steramide, mica, titania, carbon black, an oxo-degradable additive, talc, clay, pulp, thermoplastic starch, raw starch wood flour, diatomaceous earth, silica, inorganic glass, inorganic salts, pulverized plasticizer, pulverized rubber, and mixtures thereof.

19. The flexible barrier package of claim 1, wherein the outer substrate is selected from the group consisting of polyethylene terephthalate (PET), HDPE, medium density polyethylene (MDPE), LDPE, LLDPE, PLA, PHA, poly(ethylene-2,5-furandicarboxylate) (PEF), cellulose, NYLON 11, starch-based films, a bio-polyester, polybutylene succinate, polyglycolic acid (PGA), polyvinyl chloride (PVC), and mixtures thereof.

20. The flexible barrier package of claim 17, wherein the outer substrate is selected from the group consisting of PET, PEF, LDPE, LLDPE, NYLON 11, and a mixture thereof.

21. The flexible barrier package of claim 1, wherein the adhesive is a solvent adhesive.

22. The flexible barrier package of claim 1, wherein the adhesive is a solventless adhesive.

23. The flexible barrier package of claim 1, wherein the adhesive is selected from the group consisting of a urethane-based adhesive, water-based adhesive, nitrocellulose-based adhesive, a PLA-based adhesive, a starch-based adhesive, and mixtures thereof.

24. The flexible barrier package of claim 2, wherein the ink is soy-based, plant-based, or a mixture thereof.

25. The flexible barrier package of claim 4 wherein the barrier material layer is selected from the group consisting of a metal, a metal oxide, a biobased polymer comprising a metal coating, a biobased polymer comprising a metal oxide coating, a nanoclay, a silica nanoparticle coating, barrier polymer, a diamond-like carbon coating, a polymer matrix comprising a filler, a whey layer, and mixtures thereof.

26. The flexible barrier package of claim 23, wherein the metal, the metal oxide, the metal coating, or the metal oxide coating is selected from the group consisting of a foil, metallized biaxially oriented polypropylene (mBOPP), metalized PET, metalized polyethylene (mPE), aluminum, an aluminum oxide, a silicon oxide, and mixtures thereof.

27. The flexible barrier package of claim 15, wherein the filler is selected from the group consisting of a nanoclay, graphene, graphene oxide, graphite, calcium carbonate, starch, wax, mica, Kaolin, feldspar, glass fibers, glass spheres, glass flakes, cenospheres, a silica, a silicate, cellulose, cellulose acetate, and mixtures thereof.

28. The flexible barrier package of claim 25, wherein the nanoclay is selected from the group consisting of montmorillonites, bentonite, vermiculite platelets, halloysite, cloisite, smectite, and mixtures thereof.

29. The flexible barrier package of claim 5, wherein the extruded substrate is selected from the group consisting of LDPE, HDPE, LLDPE, and mixtures thereof.

30. The flexible barrier package of claim 1, wherein:
 (a) the sealant is selected from the group consisting of LLDPE, LDPE, HDPE, starch, and mixtures thereof; and,
 (b) the outer substrate is selected from the group consisting of PET, PEF, cellulose, PHA, PLA, and mixtures thereof;
wherein the package:
 (i) exhibits a MVTR of no more than about 1.8 g/m$^2$/day at 37.8° C., and 100% relative humidity (RH);
 (ii) exhibits a kinetic coefficient of friction between each of the sealant and the sealant of a second package, and the outer substrate and the outer substrate of a second package of no greater than about 0.4 at a sled weight of about 200 g and a crosshead speed of about 150 mm/min;
 (iii) can withstand a maximum load of about 50 N in cross direction (CD) and about 65 N in machine direction (MD);
 (iv) exhibits a lamination strength of sealant to outer substrate of 5 N per 25.4 mm of sample width; and,
 (v) exhibits a heat seal strength of at least 55 N per 25.4 mm width, using a heat sealing temperature of about 140° C. to about 180° C.

31. The flexible barrier package of claim 4, wherein
 (a) the sealant is selected from the group consisting of LDPE, LLDPE, HDPE, ULDPE, and mixtures thereof;
 (b) the outer substrate is selected from the group consisting of PET, PEF, and mixtures thereof; and,
 (c) the barrier material layer is selected from the group consisting of foil, mBOPP, metalized-PET, and mixtures thereof;
wherein the package:
 (i) exhibits a MVTR of no more than about 0.9 g/m$^2$/day after 5 cycle flexing;
 (ii) exhibits a kinetic coefficient of friction between the barrier material layer and the outer substrate of about 0.2 to about 0.5 in the machine direction at a sled weight of about 200 g and a crosshead speed of about 150 mm/min; and,
 (iii) exhibits a lamination strength greater than about 1.6 N per a 2.54 cm sample width between the barrier material layer and the outer substrate with a crosshead speed of 250 mm.

32. The flexible barrier package of claim 1, wherein
 (a) the sealant is selected from the group consisting of LLDPE, LDPE, HDPE, and mixtures thereof; and,
 (b) the outer substrate is selected from the group consisting of LDPE, LLDPE, HDPE, and mixtures thereof;
wherein the package:
 (i) exhibits a kinetic coefficient of friction between each of the sealant and the sealant of a second package, and the outer substrate and the outer substrate of a second package of no greater than about 0.2 at a sled weight of about 200 g and a crosshead speed of about 150 mm/min;
 (ii) can withstand a maximum load of about 50 N in cross direction (CD) and about 65 N in machine direction (MD);
 (iii) exhibits a lamination strength of sealant to outer substrate of greater than about 4 N per 25.4 mm of sample width; and,
 (iv) exhibits a heat seal strength of at least 25 N per 25.4 mm width, using a heat sealing temperature of about 140° C., a seal pressure of about 3 bar, and a seal time of about 0.5 seconds.

33. The flexible barrier package of claim 1, wherein
 (a) the sealant is selected from the group consisting of LDPE, LLDPE, HDPE, and mixtures thereof; and,
 (b) the outer substrate is nylon;
wherein the package:
 (i) exhibits a lamination strength of sealant to outer substrate of at least about 7 N per 15 mm of sample width; and,
 (iii) exhibits a heat seal strength of about 35.3 N per 15 mm at about 300 mm/min.

34. The flexible barrier package of claim 5, wherein
 (a) the sealant is selected from the group consisting of LDPE, LLDPE, HDPE, and mixtures thereof;
 (b) the outer substrate is selected from the group consisting of PET, PEF, and mixtures thereof; and,
 (c) the extruded substrate is selected from the group consisting of LDPE, LLDPE, HDPE, and mixtures thereof;
wherein the package:
 (i) exhibits a static coefficient of friction between each of the sealant and outer substrate, and the outer substrate and the outer substrate of a second package of about 0.1 to about 0.4 at a sled weight of about 200 g and a crosshead speed of about 150 mm/min;
(ii) exhibits a lamination strength of each of the sealant to extruded substrate and extruded substrate to outer substrate of at least about 1.67 N per 25.4 mm of sample width; and,
(iii) exhibits a heat seal strength of at least about 30 N per 25.4 mm width, using a heat sealing temperature of about 130° C., a pressure of about 3 bar, and a sealing time of about 1.5 seconds.

35. The flexible barrier package of claim 1 further comprising post-consumer recycled polymers.

\* \* \* \* \*